United States Patent [19]

Booth

[11] 4,010,040

[45] Mar. 1, 1977

[54] MODIFIED MIXING TECHNIQUE FOR CARBONACEOUS STOCK

[75] Inventor: Roy E. Booth, Berea, Ohio

[73] Assignee: The United States of America as represented by the Secretary of the Navy, Washington, D.C.

[22] Filed: Dec. 5, 1974

[21] Appl. No.: 529,889

[52] U.S. Cl. .................................. 106/281 R
[51] Int. Cl.² ................................. C08L 95/00
[58] Field of Search .......... 106/277, 281, 283, 284, 106/38.5, 38.8; 264/29; 423/488

[56] References Cited

UNITED STATES PATENTS

| | | | |
|---|---|---|---|
| 3,419,645 | 12/1968 | Pietzka et al. | 264/29 |
| 3,567,808 | 3/1971 | Smith | 264/29 |
| 3,651,179 | 3/1972 | Shea et al. | 264/29 |
| 3,708,451 | 1/1973 | McWhorter et al. | 264/29 X |
| 3,812,240 | 5/1974 | Whittaker et al. | 264/29 |

OTHER PUBLICATIONS

Abraham, *Asphalts and Allied Substances*, vol. 2, Sixth Ed., D. Van Nostrand Co. Inc., N. J., 1960.
Rose, *The Condensed Chemical Dictionary*, Seventh Ed., N. Y., Van Nostrand Reinhold Co., 1966, p. 696.

*Primary Examiner*—Theodore Morris
*Attorney, Agent, or Firm*—R. S. Sciascia; Philip Schneider; Thomas E. McDonnell

[57] ABSTRACT

A method of compounding graphitizable compositions and improving the dispersion of filler particles and binder which comprises introducing the carbon filler into a hot-shear mixer, adding from about 25 to about 70 pph of water, adding from about ¼ to about 5 pph of a dispersant, mixing for about ½ hour at a temperature at least above the boiling point of water (100°), adding a binder, and mixing for about an additional one hour at a temperature above the melting point of the binder.

1 Claim, No Drawings

MODIFIED MIXING TECHNIQUE FOR CARBONACEOUS STOCK

BACKGROUND OF THE INVENTION

The present invention pertains generally to processes for manufacturing polycrystalline graphitizable stock, and in particular to mixing procedures for the manufacture of polycrystallize graphitizable stock in which a fine-grain filler is used.

Graphitizable compositions usually contain a carbon particle filler such as calcined coke and a thermoplastic binder such as a coal tar pitch to bind the filler particles together. Instead of a thermoplastic binder, the binder may be thermosetting resin such as epoxy. Optional additives such as iron oxide may be included. Essentially a graphitizable composition is one which forms graphite upon application of sufficient heat.

It is most desirable to obtain a homogeneous distribution of binder and filler during the mixing cycle in the manufacture of poly-crystalline graphitizable articles. If not, agglomerated fine particles resist penetration of liquid binder and the result is either binder rich or binder lean areas within the molded or baked stock. Since the strength of graphite stock is to a great extent determined by the carbon bond formed by the binder between filler particles upon baking, such irregularities weaken the stock. Further these discontinuities allow for the entrapment of air during mixing which disrupts the microstructure during the baking. Thus, improvements in binder distribution around the filler particles would reduce part-to-part variations and improve the baked physical properties.

This problem is particularly serious with fine-grain (74 microns or 200-mesh-screen maximum particle size) carbon filler or fillers with a fine-grain component. Small particles have a high surface-area-to-volume ratio which denotes a large quantity of surface charges, both positive and negative. Accordingly, small particles tend to agglomerate to a greater extent than larger particles, and it is more difficult to obtain a uniform distribution of pitch and filler particles during mixing.

With present techniques, all ingredients for a given formulation are weighed and transferred to a mixer after any necessary preparation and sizing of the raw materials. In certain formulations the dry ingredients are often preblended in a twin shell blender or its equivalent, but this additional technique does not completely eliminate the agglomeration of the fine particles of the filler.

SUMMARY OF THE INVENTION

It is therefore an object of this invention to provide a mixing procedure for graphitizable stock processing which upon molding and baking reduces part-to-part variations.

Another object is to provide a mixing procedure for graphitizable stock processing which increases density, decreases resistivity, increases the elastic modulus, and increases the strength of the final product.

A further object is to provide a mixing procedure for graphitizable stock processing, which gives a more uniform binder distribution around the filler particles.

These and other objects are achieved by a mixing procedure wherein a more uniform dispersion of filler particles and binder is achieved by slurrying the filler with water and a dispersant and then by removing most of the water through initially mixing the slurry at an elevated temperature before adding the binder and mixing for an additional period.

DETAILED DESCRIPTION OF THE INVENTION

The process of the instant invention is applicable to any graphitizable composition. The particular ratio of the carbon filler to binder does not alter the effect produced by the present invention, i.e., an improved filler distribution, nor is the type of carbon filler critical. Of course, the technique given by the present invention would be most effective with fine-particle sizes. Similarly, there are no restrictions on the type of binder which can be used.

The mixing procedure of this invention comprises the steps of introducing the carbon filler into a hot-shear mixer, adding water in an amount from about 25 to about 70 pph, adding from about ¼ to about 5pph of a dispersant, mixing the slurry at a temperature at least above the boiling point of water (100° C) until the material is merely moist or dry adding a binder, and mixing for about an additional one hour at a temperature above the melting point of the binder.

The practice of this invention does not impose any limitations on the selection of equipment. Hence the selection of equipment and operating conditions would be determined by the requirements of the end product.

Dispersants suitable for the practice of the invention would sequester filler particles in water. Examples of suitable dispersants would be sodium, silicate, sodium carbonate, various sodium phosphates, and lignosulfonates (a commercial grade is Maraperse).

Although it has been shown by this invention that it is possible to add enough water and dispersant to significantly improve the sequestering without having residual water and dispersant in the final product, optimization of results would require care to be exercised in selecting the correct amount of dispersant and water. For example, for batch sizes up to 10 lb., best results would be achieved with 65–70 pph of water and ¼ to ½ pph of dispersant. As the batch size increases, the amount of water to be used should decrease which would require additional dispersant. Thus, with large production scale batches of several hundred pounds, e.g., 800–900 lb., the quantity of water would be around 25 pph and the amount of dispersant would be around 5 pph.

Having generally described the invention, the following example is given for purposes of illustration. It is to be understood that the invention is not limited to this example, but is susceptible to different modifications that would be recognized by one of ordinary skill in the art.

EXAMPLE I

The control and improved stocks were made from 1000 grams of calcined petroleum coke with a maximum particle size of 74 microns (equivalent ot 200-mesh screen) and 55 pph coal tar pitch with a melting point of 130° C. The coke particles and crushed pitch for processing the control stock were distributed with a shearing mixer at 175° C for one-hour duration. The modified mixing technique applied to identical ingredients as described above, consisted of premixing the particles with 70 pph water and ½ pph Marasperse N-22, American Can Company, Greenwich, Conn. The coke particles, dispersant, and water were premixed at 175° C within a shearing mixer prior to the addition of pitch. After one-half hour, most of the water had volatilized and crushed pitch was then added. Mixing continued one hour longer at 175° C.

The mixes were cooled, crushed, and sized to a 149-micron (100-mesh) maximum particle size and molded at 5 tons-per-square inch. The stock was baked in a pack consisting of coke and sand to a final temperature of 850° C. The physical properties of both samples are tabulated in Table I.

TABLE I

| Sample No. | Particulate Ingredient | | Binder level pph | Blending(') technique | 850° C Bake Physical Property Data | | | |
|---|---|---|---|---|---|---|---|---|
| | −200M coke Wt. % | Fine coke Wt. % | | | A.D. g/cc | Resistivity ohm-cm × 10−4 | Modulus psi × 10⁶ | Flexural strength psi |
| 1 | 60 | 40 | 55 | W* | 1.568 | 68.56 | 2.09 | 2386 |
| 2 | 60 | 40 | 55 | D* | 1.500 | 88.00 | 1.63 | 1588 |

*W = Wet = inventive process
D = Dry = conventional (control)

As the test results show, the modified mixing technique resulted in increasing the apparent density 4.5 percent, decreasing the resistivity 22.7 percent, increasing the sonic modulus 28.2 percent, and increasing the flexural strength 50.3 percent. Thus, the process of this invention provides a technique for improving the physical properties of conventionally molded and baked stock by improving the dispersion of filler and binder.

Obviously many modifications and variations of the present invention are possible in light of the above teachings. It is therefore to be understood that, within the scope of the appended claims, the invention may be practiced otherwise than as specifically described.

What is claimed and desired to be secured by letters patent of the United States is:

1. A method of compounding graphitizable compositions which comprise introducing a carbon particle filler into a hot-shear mixer, adding from about 25 to about 70 pph of water, adding from about ¼ to about 5 pph of a dispersant, premixing at a temperature at least about the boiling point of water (100° C) until most of the moisture is eliminated, adding a binder, and mixing for about an additional one hour at a temperature above the melting point of the binder.

* * * * *